United States Patent Office 3,074,949
Patented Jan. 22, 1963

3,074,949
PROCESS FOR THE PREPARATION OF TRANS-2,5-DIMETHYL PIPERAZINE
Harry Douglas Williams, Penns Grove, N.J., assignor to E. I. du Pont de Nemours and Company, Wilmington, Del., a corporation of Delaware
No Drawing. Filed Jan. 25, 1954, Ser. No. 406,055
5 Claims. (Cl. 260—268)

This invention relates to the preparation of trans-dimethylpiperazine from cis-dimethylpiperazine.

Relatively large amounts of the cis form have been available commercially. However, a substantial demand for the trans isomer has been established in the industry. Heretofore, no effective means have been available for converting the cis form to the trans form.

The object of the present invention is a process for the conversion of cis-2,5-dimethylpiperazine to trans-2,5-dimethylpiperazine. Other objects will be appreciated from the following description of the invention.

This invention comprises the isomerization of cis-dimethylpiperazine to trans-dimethylpiperazine by heating the cis form with a suitable catalyst, preferably in the presence of hydrogen. Hydrogenation catalysts, for instance, may be used. Any of the metals of group VI-A or group VIII of the periodic table may be used as catalysts. Preferred catalysts include palladium-on-carbon, reduced cobalt, and copper barium chromite. The invention is more readily understood by referring to the following examples.

Example 1

Liquid cis-dimethylpiperazine was heated with a copper barium chromite catalyst for two and one-half hours at a temperature of approximately 240° C. and under a hydrogen pressure of 1700 p.s.i. Conversion to the trans form was observed to the extent of 80%. This was determined by means of a standard infrared analysis of the product.

Example 2

Cis-2,5-dimethylpiperazine was heated at a temperature of 160° C. in the presence of a palladium-on-carbon catalyst. After three hours it was observed that the material was converted to the trans isomer to the extent of 70%. The catalyst % itself was composed of 10% of palladium and the remainder was carbon.

Example 3

The cis isomer of dimethylpiperazine was heated at 180° C. for approximately three hours, under a hydrogen pressure of 1500 p.s.i. and in the presence of a reduced cobalt catalyst. The catalyst was present in the mixture to the extent of 10% by weight. A conversion to the trans isomer to the extent of 26% was observed.

Example 4

Cis-2,5-dimethylpiperazine was heated for one and one-half hours at 180° C. under a hydrogen pressure of 1750 p.s.i., in the presence of a catalyst comprising palladium-on-carbon. Methanol was employed as a diluent. The catalyst was present to the extent of 8% by weight and was composed of 10% palladium and 90% carbon. A conversion to the trans isomer was observed to the extent of 15%.

Example 5

The cis form of dimethylpiperazine was heated in the presence of a Raney nickel catalyst at a temperature of 160° C. for a period of five hours. Conversion to the trans isomer to the extent of 10% was observed in this period. The catalyst was present to the extent of 10% by weight.

Example 6

Cis-2,5-dimethylpiperazine, 50 g., was heated with reduced nickel-on-carbon, 5 g., for 2 hours at a temperature of 250° C. and under a hydrogen pressure of 1500 p.s.i. Conversion to the trans form was observed to the extent of 64%.

Example 7

Cis-2,5-dimethylpiperazine, 25 g., was heated with platinum-on-carbon, 4 g., for 5 hours at reflux (160° C.). The catalyst was composed of 1% platinum and 99% carbon. Conversion to the trans form was observed to the extent of 12%.

Example 8

Cis-2,5-dimethylpiperazine was heated for 20 hours at 60° C. in the presence of palladium-on-carbon. The catalyst was present to the extent of 8% by weight and was composed of 10% palladium and 90% carbon. A conversion to the trans isomer was observed to the extent of 60%.

Example 9

Cis-2,5-dimethylpiperazine was heated for 20 hours at 100° C. in the presence of palladium-on-carbon. The catalyst was present to the extent of 1% by weight and was composed of 10% palladium and 90% carbon. A conversion to the trans isomer was observed to the extent of 8%.

It will be observed from the foregoing examples that it is preferable to carry out the process of the present invention in the presence of a substantial hydrogen pressure. However, it will be noted that when the catalyst was Raney nickel or finely divided palladium black supported on carbon, conversion was obtained at relatively low temperatures without added hydrogen. At higher temperatures other catalysts are effective without added hydrogen. This may be due to the fact that these catalysts commonly contain considerable hydrogen in association, either in solution or bound in some other manner.

The principal advantage of the present invention lies in the fact that it permits the facile conversion of the more plentiful cis-2,5-dimethylpiperazine to the more desirable trans-2,5-dimethylpiperazine.

It is intended that the invention shall be limited only by the following patent claims.

I claim:
1. The process for the conversion of cis-2,5-dimethylpiperazine to trans-2,5-dimethylpiperazine which comprises heating the cis isomer in the presence of a hydrogenation catalyst.
2. The process for the conversion of cis-2,5-dimethylpiperazine to trans-2,5-dimethylpiperazine which comprises heating the cis isomer in the presence of reduced nickel.
3. The process for the conversion of cis-2,5-dimethylpiperazine to trans-2,5-dimethylpiperazine which comprises heating the cis isomer in the presence of a copper chromite.
4. The process for the conversion of cis-2,5-dimethyl piperazine to trans-2,5-dimethyl piperazine which comprises heating the cis isomer in the presence of a hydrogenation catalyst derived from a metal selected from the class consisting of metals of groups VI-A and VIII of the periodic table.
5. A process of claim 4 wherein said cis isomer is heated in the presence of hydrogen and said hydrogenation catalyst.

References Cited in the file of this patent
Godchot et al.: Bull. Soc. Chim., 51, 349–360 (1932).